United States Patent [19]

Goertz et al.

[11] Patent Number: 4,929,690

[45] Date of Patent: May 29, 1990

[54] PREPARATION OF METAL SALTS OF CARBOXYL-CONTAINING POLYMERS

[75] Inventors: Hans-Helmut Goertz, Freinsheim; Walter Denzinger, Speyer; Hans-Juergen Raubenheimer, Ketsch, all of Fed. Rep. of Germany

[73] Assignee: BASF Aktiengesellschaft, Ludwigshafen, Fed. Rep. of Germany

[21] Appl. No.: 264,021

[22] Filed: Oct. 28, 1988

[30] Foreign Application Priority Data

Oct. 31, 1987 [DE] Fed. Rep. of Germany ....... 3736997

[51] Int. Cl.$^5$ .............................................. C08F 8/42
[52] U.S. Cl. ................................. 525/366; 525/373; 525/327.8; 525/329.5; 525/329.6; 525/330.3; 525/367; 525/368; 525/369; 525/370; 525/371; 525/37
[58] Field of Search ............... 525/366, 368, 369, 370, 525/371, 372, 373, 367

[56] References Cited

U.S. PATENT DOCUMENTS

| | | |
|---|---|---|
| 3,267,083 | 8/1966 | Imhof ................................. 525/330.2 |
| 3,297,657 | 1/1967 | Gray et al. . |
| 3,472,825 | 10/1969 | Walter et al. ..................... 525/330.2 |
| 3,950,260 | 4/1976 | Eldib ................................. 525/330.2 |
| 4,027,082 | 5/1977 | Gavrilova et al. ............... 525/330.2 |

FOREIGN PATENT DOCUMENTS 1511652 5/1948 United Kingdom .

*Primary Examiner*—Bernard Lipman
*Attorney, Agent, or Firm*—Oblon, Spivak, McClelland, Maier & Neustadt

[57] ABSTRACT

Metal salts of carboxyl-containing polymers are prepared by suspending carboxyl and/or carboxylic anhydride group-containing polymers in an inert solvent, reacting with a pulverulent basic metal compound, and then working up the suspension.

9 Claims, No Drawings

PREPARATION OF METAL SALTS OF CARBOXYL-CONTAINING POLYMERS

The present invention relates to a process for preparing metal salts of carboxyl-containing polymers.

Water-soluble and water-swellable salts of carboxyl-containing polymers are very important in many fields. For example, lightly crosslinked homopolymers and copolymers of acrylic acid, methacrylic acid, maleic acid and itaconic acid are used in the form of their salts as thickeners in cosmetic and pharmaceutical formulations, in textile print pastes and in liquid detergent compositions in increasing amounts. Even uncrosslinked carboxylcontaining polymers of low or high molecular weight are widely used as dispersants, detergent assistants, textile sizing agents, water treatment agents, assistants in oil production, to name but a few. In cosmetics, they are used for example as film formers in hair care, as additives in dentifrices and as assistants in denture fixatives.

Polycarboxylates and polysulfonates are customarily prepared by polymerizing the monomers in the salt form, for example in the form of the sodium salt, in aqueous solution and then, if necessary, isolating the polymeric salt in the form of a solid by drying.

However, this simple method presupposes that all the monomers used are soluble in water and impervious to water and that the product obtained in water can be handled without problems. These conditions are not met in many cases. For instance, a whole range of important and frequently used comonomers such as olefins, acrylic esters, vinyl esters, vinyl ethers and others are not soluble in water, so that the polymerization is preferably carried out in organic solution It is true that in the case of lightly crosslinked polycarboxylates, for example lightly crosslinked polyacrylic acid and salts thereof, a polymerization in water is possible, but the stiff gel obtained is difficult to handle. In this case, it is advisable to resort to a precipitation polymerization in an inert organic medium, obtaining a readily handleable suspension from which a pulverulent product can be isolated by drying.

However, in all cases where the technique of precipitation or suspension polymerization is employed, the polycarboxylates are obtained in the form of the free acid or the anhydride thereof. A precipitation polymerization of the salts, for example of sodium acrylate, in an organic solvent is not possible because the monomer is insufficiently soluble. The salts of uncrosslinked polymers prepared by the methods described above are therefore customarily obtained by utilizing the precipitation or suspension polymer, for example with aqueous sodium hydroxide solution, any anhydride ring present on the polymer opening beforehand or at the same time. The neutralization and any hydrolysis with an aqueous alkali metal hydroxide solution can take place in suspension immediately following the precipitation polymerization. Removal of the organic solvent by phase separation or distillation leaves the aqueous solution of the polycarboxylate. Such a procedure is described for example in U.S. Pat. No. 2,297,657 for a copolymer of maleic anhydride and styrene prepared by precipitation polymerization in toluene/petroleum ether and in GB No. 1,511,652 for a copolymer of maleic anhydride and diisobutene.

It is also possible, however, to admix the pulverulent product with water or an alkali metal hydroxide solution and in this way obtain the aqueous solution of the polycarboxylate directly. This is advisable for example when the solvent used in the precipitation polymerization is difficult to remove from the mixture with water because of a high boiling point or when the pulverulent product was obtained by another method of preparation entirely.

From the aqueous polycarboxylate solutions obtained in the Examples described herein it is possible, if desired, to obtain the pulverulent solid products by customary drying methods.

In the specific case of calcium salts there are difficulties in the preparation from aqueous polycarboxylate solutions and calcium hydroxide because the sparingly water-soluble calcium hydroxide, on contact with the aqueous polycarboxylate solution, forms clumps and solid aggregates which are very slow to dissolve even at high temperatures.

In specific cases the preparation of metal salts of carboxyl-containing polymers is also possible, as described in EP 106,991, by mixing a carboxyl- or anhydrido-containing polymer in the solid form with suitable metal salts, for example alkali metal carbonates. The disadvantage here is that the polymer must first be isolated in a solid form and, what is more, homogeneous mixing and complete reaction in the solid mixture is not simple to realize.

It is an object of the present invention to provide a technically simple process for preparing metal salts of carboxyl-containing water-soluble or water-swellable polymers.

We have found that this object is achieved with a process where a carboxyl- and/or carboxylic anhydride group-containing polymer is reacted with a pulverulent basic metal compound by performing the reaction in suspension in an inert solvent in which the polymer and its metal salt are insoluble and then working up.

Other objects and advantages of the invention will be apparent from the further description and the Examples.

Polymers which can be made to react according to the invention are homo- and copolymers of carboxyland/or carboxylic anhydride group-containing monomers with or without other monomers. Carboxyl-containing monomers are for example acrylic acid, methacrylic acid, crotonic acid, maleic acid, itaconic acid, citraconic acid and fumaric acid. Polymers which contain acrylic acid and methacrylic acid are particularly preferred. Carboxylic anhydride group-containing monomers are maleic anhydride, itaconic anhydride and citraconic anhydride. Polymers which contain maleic anhydride are particularly preferred.

Possible comonomers are those which are copolymerizable with carboxyl- and/or anhydrido-containing monomers. Possibilities are in particular olefins of from 2 to 30 carbon atoms, branched or unbranched, such as ethylene, propylene, 1-butene, 2-butene, isobutene, 2,2,4-trimethylpentene (including in the form of the technical grade isomer mixture), 1-dodecene, vinyl esters of monocarboxylic acids of from 2 to 10 carbon atoms, such as vinyl acetate, vinyl propionate and vinyl esters of branched carboxylic acids, alkyl vinyl ethers of from 1 to 18 carbon atoms in the alkyl radical, such as methyl vinyl ether, ethyl vinyl ether, butyl vinyl ether, isobutyl vinyl ether, 2-ethylhexyl vinyl ether and octadecyl vinyl ether, aromatic vinyl compounds such as styrene, 4-methylstyrene and a-methylstyrene, N-vinylamides such as N-vinylpyrrolidone, N-vinylcaprolactam, N-vinylformamide and N-methyl-N-vinylacetamide, sulfocontaining monomers such as styrenesulfonic acid, vinylsulfonic acid and acrylamidomethylpropanesulfonic acid, and also vinylphosphonic acid.

Comonomers coming into consideration also include those which contain more than one polymerizable vinyl group, for example butanediol divinyl ether, divinyldioxane, divinylbenzene, pentaerythritol triallyl ether, butanediol diacrylate and polyethylene glycol diacrylate.

Preferred polymers for conversion according to the invention are in particular lightly crosslinked polyacrylic acid, (alternating) copolymers of maleic anhydride and olefins of 2 to 30 carbon atoms, such as in particular ethylene, isobutene, diisobutene and 1-dodecene, with or without crosslinking, (alternating) copolymers of maleic anhydride with vinyl esters of carboxylic acids of from 2 to 10 carbon atoms, in particular vinyl acetate and vinyl propionate, with or without crosslinking, alternating copolymers of maleic anhydride with alkyl vinyl ethers of from 1 to 18 carbon atoms in the alkyl radical, in particular methyl vinyl ether and isobutyl vinyl ether, with or without crosslinking, and copolymers of maleic anhydride and styrene, with or without crosslinking.

According to the invention, the carboxyl- and/or carboxylic anhydride group-containing polymers are suspended in a suitable inert organic liquid and made to react. For example, a suitable polymer can be prepared by bulk, solution, precipitation or suspension polymerization, converted into a finely divided powder form and then suspended in this powder form in an inert organic liquid. Inert for the purposes of the present invention denotes that the liquid does not undergo any reaction with the suspended polymer, for example with its carboxyl or anhydride groups. The suspended particles of the polymer advantageously have an average particle diameter within the range from $10^{-5}$ to $10^{-1}$ mm.

Which organic medium is suitable is easy to determine in a particular case. Particular suitability is possessed by straight-chain and branched aliphatic and cycloaliphatic hydrocarbons, for example pentane, hexane, heptane, octane, isooctane, cyclohexane, diethylcyclohexane and dimethylcyclohexane, aromatics such as benzene, toluene, o-xylene, m-xylene, p-xylene and technical grade mixtures thereof, ethylbenzene, diethylbenzene or methylethylbenzene, halogenated hydrocarbons such as methylene chloride, 1,1-dichloroethane, 1,2-dichloroethane, 1,1,1-trichloroethane, 1,1,2-trichloroethane, 1,1,2-trichloroethylene,perchloroethylene,1,2-dichloropropane, 1-chlorobutane,1,1,2-trichloro-1,2,2-trifluoroethane, 1,1,1,2-tetrachloro-2,2-difluoroethane and 1,1,2,2-tetrachloro-1,2-difluoroethane. Also suitable are esters containing no fewer than 5 carbon atoms in the molecule and obtainable from saturated aliphatic carboxylic acids and monohydric saturated alcohols. They are for example alkyl carboxylates such as n-butyl formate, sec-butyl formate, isobutyl formate, tert-butyl formate, n-propyl acetate, isopropyl acetate, butyl acetate, sec.butyl acetate, isobutyl acetate, tert-butyl acetate, pentyl acetate in the various isomeric forms, ether propionate, n-propyl propionate, isopropyl propionate, butyl propionate in its isomeric forms, methyl butyrate, ethyl butyrate, propyl butyrate, isopropyl butyrate, ethyl isobutyrate, n-propyl isobutyrate and isopropyl isobutyrate n-Propyl acetate and isopropyl acetate are particularly suitable.

According to the invention, particular preference is given to a process where the suspension of a suitable polymer is directly obtained in the preparation thereof. This is the case when the polymerization is carried out as a precipitation or suspension polymerization in an organic medium. The abovementioned solvents are particularly suitable for this purpose. For example, lightly crosslinked polyacrylic acid can be obtained by precipitation polymerization in aromatics such as benzene, toluene or xylene or in chlorinated hydrocarbons such as butyl chloride, methylene chloride, 1,2-dichloroethane or 1,1,1-trichloroethane. In the same solvents it is also possible to carry out a precipitation polymerization of maleic anhydride/vinyl alkyl ether, for example maleic anhydride/vinyl ethyl ether. The copolymerization of maleic anhydride with diisobutene can be carried out in an excess of the olefin as a suspension polymerization. All these examples have in common the fact that the polymer is obtained as a finely divided suspension in an organic medium.

By adding a pulverulent basic metal compound to one of the suspensions described above conversion to the corresponding metal carboxylate is obtained. The basic metal compound advantageously has an average particle diameter within the range from $10^{-5}$ to $10^{-1}$ mm.

The solids content of the suspension used can vary within the range from 5 to 70% by weight, the range from 15 to 60% by weight being preferred. In the course of the reaction there is generally no noticeable change in the appearance and stirrability of the suspension. If, however, there is an unduly large increase in the viscosity of the suspension, it is possible to dilute with a solvent, advantageously with the same solvent as used in the preparation of the suspension. Owing to the unproblematic nature of the reaction mixture, nothing other than standard apparatus is required for performing the reaction. The pulverulent metal compound may be added by means of a metering screw. To avoid an electrostatic charge buildup in the course of addition, the addition is advantageously carried out under an inert gas, for example by means of a star wheel lock. The actual reaction vessel is a customary stirred kettle equipped with a horseshoe blade, impeller or multistage pulse countercurrent stirrer for the necessary thorough mixing of the contents.

The course of the reaction can be accelerated if necessary by raising the temperature for example up to the boiling point of the inert organic solvent used. Preference is given to working within the range from room temperature to the boiling point of the solvent, but below the glass transition temperature of the polymer.

The protective colloids generally present in the suspension from the preparation have no effect on the course of the reaction.

Basic metal compounds which are suitable according to the invention are oxides, hydrogencarbonates, carbonates and in particular hydroxides. The preferred metals are sodium, magnesium, calcium and aluminum The basic metal compound can be added in an amount of up to 1, preferably from 0.1 to 1, equivalent of metal compound per acid group in the polymer or up to 2, preferably from 0.2 to 2, equivalents of metal compound per anhydride group in the polymer.

If the preparation of mixed salts is desired, it is also possible to add different metal compounds, for example calcium hydroxide and sodium hydroxide, conjointly or one after the other. The metal compounds are advantageously used in a finely pulverulent form in order to maximize the rate and homogeneity of mixing into the suspension and to minimize the reaction time.

Drying the resulting suspension either immediately or after a large part of the liquid has been separated off by filtration or centrifuging leads to the pulverulent metal salts of the corresponding carboxylcontaining polymers. Drying can take place in a conventional manner, using for example a drum, belt, paddle, spray or fluidized bed dryer. That conversion to the corresponding metal salt has taken place is apparent in many cases from the good water solubility or swellability of the product.

If the desired end product is an aqueous solution of the metal salt of the carboxyl-containing polymer, water can be added to the suspension after the reaction and the organic solvent removed by phase separation, by distillation or by stripping out with steam. In this way an aqueous solution is obtained directly. The particular advantage of this procedure following the conversion according to the invention is that there are no problems with foam of the type observed on adding water or aqueous alkali metal hydroxide solution to polymeric anhydrides in suspension and then stripping out the solvent. This advantage becomes important in particular in the case of high molecular weight products. A further advantage arises in the preparation of alkaline earth metal, specifically calcium, salts. Attempts to convert an aqueous polycarboxylate solution into the salt with milk of lime tends to give rise to hard agglomerates which are extremely slow to dissolve even in the course of prolonged boiling. This unpleasant effect is completely avoided when, according to the invention, the conversion takes place with solid calcium hydroxide in an organic suspension and water is only added afterwards.

The Examples which follow serve to illustrate the invention. Any reported viscosities were measured at 25° C. using a type LVF Brookfield viscometer. K values were determined on 1% strength solutions at 25° C. by the method of Fikentscher.

EXAMPLE 1

In a 6-1 stirred autoclave equipped with a reflux condenser, a nitrogen inlet tube, a thermometer, and two metering means, 1394 g of 1,1,1-trichloroethane, 500 g of anhydrous acrylic acid and 4 g of pentaerythritol allyl ether were heated to 55° C. in a slow stream of nitrogen. An initiator solution was then prepared from 0.5 g of dicyclohexyl peroxidicarbonate in 80 ml of 1,1,1-trichloroethane. After 55° C. had been reached in the stirred autoclave, 3.6 ml of initiator solution were added. After 5 minutes the polymer formed a fine precipitate, indicated by the onset of cloudiness. Every 15 minutes for a period of 8 hours 1.8 ml of initiator solution were then added. The suspension formed became more and more viscous in the course of the polymerization. To keep the suspension readily stirrable, it was diluted with 1.8 liters of 1,1,1-trichloroethane a little at a time. After 8 hours of initiator addition the remaining initiator solution was added all at once, and the suspension was heated at the boil at 74° C. for 1 hour. (The suspended particles had an average diameter of 0.5 $\mu$m and were present in agglomerates of 20 $\mu$m.) This was followed by cooling to 60° C., the addition in the course of 30 minutes of 250 g of pulverulent sodium hydroxide having an average particle diameter of 50 $\mu$m and a further 2 hours of heating at the boil. The viscous suspension was then evaporated to dryness in a rotary evaporator under a water jet vacuum at a bath temperature of 70° C. A very fine floury white powder was obtained which, on stirring in 0.3% strength into water produced a clear amorphous gel having a viscosity of 30 Pa.s. The powder is useful as a thickener, for example for cosmetic formulations.

EXAMPLE 2

In a 2-1 stirred glass vessel equipped with a reflux condenser and add vessels, a solution of 125.6 g of maleic anhydride in 400 g of benzene was heated to 58° C. 90 g of vinyl methyl ether in 350 g of benzene were then added, and the solution began to boil gently. A solution of 0.2 g of 2,2'-azobis(2,4-dimethylvaleronitrile) was added, 6 ml of the add being run in at once and after 20 minutes the remainder being added dropwise in the course of 5 hours. Throughout this period the mixture was gently refluxed, the initial boiling point of about 50°-55° C. rising to 80° C. After the addition had ended, the mixture was stirred at 80° C. for a further hour, and 200 ml of benzene were then distilled off. A viscous white suspension was obtained. A small sample was taken and dried. The average particle diameter of the powder was 0.05 $\mu$m. The K value of the polymeric anhydride in cyclohexanone was 98. 40 g of magnesium hydroxide having an average particle diameter of 0.1 $\mu$m were added to the suspension at 60° C. and stirred in at 60° C. for 1 hour.

Thereafter 800 ml of water were added and stirred in at 80° C. for 4 hours. The benzene was then stripped off with steam, and a further 200 ml of water were added for dilution. The aqueous solution obtained was admixed with 14.5 g of sodium hydroxide in 300 ml of water. The K value of the mixed magnesium/sodium salt obtained in water was 120.

EXAMPLE 3

The polymerization of Example 2 was repeated. The K value of the polymeric anhydride in cyclohexanone was 90. 52.4 g of pulverulent calcium hydroxide having a particle diameter of 0.01 $\mu$m were added to the suspension and stirred in at 60° C. for 1 hour. 14.5 g of pulverulent sodium hydroxide 50 $\mu$m in particle diameter were then added and stirred in at 60° C. for a further hour. 800 ml of water were then added, and the benzene was stripped off with steam. The resulting clear solution of the mixed calcium/sodium salt had a polymer content of 14.6%. The K value in water was 120. The solid product obtainable by drying can be used for formulating denture fixatives.

EXAMPLE 4

In a 2-1 stirred glass vessel equipped with a reflux condenser, a nitrogen inlet tube, a thermometer and metering means, 571 g of toluene, 63.5 g of methyl ethyl ketone, 16 g of polystyrene of molecular weight 60,000, 200 g of maleic anhydride, 204 g of vinyl isobutyl ether and 10 g of divinyldioxane were heated to 65° C. in a slow stream of nitrogen. An initiator solution was then prepared from 0.4 g of 2,2,-azobis(isobutyronitrile) and 40 ml of toluene. 4 ml of this solution were then added to the stirred vessel. The temperature rose exothermically, indicating the onset of the polymerization. After 2.5 hours at 65° C. a further 4 ml of initiator solution were added and after a further 15 minutes, since there was no further final reaction, the remaining initiator solution, and the polymerization was completed at 80° C. in the course of 1 hour. (Average diameter of the suspended particles 2-3 μm.) 155 g of pulverulent sodium hydroxide 50 μm in particle diameter were then added to the slightly viscous polymer suspension in the course of 30 minutes, and the suspension was then heated at 80° C. for 2 hours. It was then introduced into a paddle dryer, and the solvent was distilled off in the course of 2 hours at a bath temperature of 80° C. under a water jet vacuum. A slightly sintered coarsely grained powder was obtained which, on dissolving in 1% strength in water, gave a slightly cloudy solution having a high viscosity of 60 Pa.s. It is suitable for use as a thickener for textile print pastes.

EXAMPLE 5

In a stirred autoclave as in Example 1, 1507.5 g of diisobutene (isomer mixture comprising 80% by weight of 2,4,4-trimethyl-1-pentene and 20% by weight of 2,4,4-trimethyl-2-pentene), 630 g of maleic anhydride and 5 g of a polyvinyl ethyl ether having a K value of 50 (measured in cyclohexanone) were heated to the boil at about 102° C., and a solution of 13.5 g of tert-butyl per(2ethylhexanoate) in 100 g of diisobutene, was then metered in over 4 hours. The mixture was then polymerized for 1 hour. The resulting low-viscosity white suspension (particle diameter 2 μm) was cooled to 80° C., 385 g of finely pulverulent sodium hydroxide 50 μm in particle diameter were then metered into the autoclave in the course of 30 minutes, and the mixture was subsequently heated at 80° C. for 2 hours. The autoclave contents were then emptied into a paddle dryer and dried at 80° C. under a water jet vacuum in the course of 3 hours.

The powder obtained gave a slightly cloudy solution in water which, for a solids content of 25%, had a viscosity of 40 mPa.s. The solution is useful as a dispersant for pigments such as zinc oxide or titanium dioxide in water.

EXAMPLE 7

100 g of an alternating copolymer of maleic anhydride and vinyl methyl ether with a K value of 44 (measured in cyclohexanone) and an average particle diameter of 0.05 μm were suspended in 400 g of toluene in a 1-1 stirred glass vessel 64 g of potassium hydrogencarbonate (particle diameter 1μm) were then added, and the mixture was heated at the boil for 2 hours. The finely divided white suspension was filtered, and the filter cake was dried overnight at 50° C. in a water jet vacuum. The floury powder obtained was soluble in cold water. A 5% strength solution in distilled water had a viscosity of 18 mPa.s.

EXAMPLE 8

In a 2-1 glass apparatus equipped with a stirrer, a reflux condenser and add vessels, a solution of 125.6 g of maleic anhydride in 400 g of 1,1,1-trichloroethane was heated to 60° C. A solution of 90 g of vinyl methyl ether in 350 g of 1,1,1-trichloroethane was then added with stirring, and the mixture began to boil gently. A solution of 0.2 g of 2,2'-azobis(2,4-dimethylvaleronitrile) in 50 g of 1,1,1-trichloroethane was then added, 4 ml being added at once and stirred in at 60° C. for 20 minutes, and the remainder then being added dropwise in the course of 5 hours. During this time the mixture was kept at a gentle boil. It was subsequently stirred under reflux for 1 hour, and 200 ml of 1,1,1-trichloroethane were then distilled off. A sample was taken of the viscous white suspension and dried (average particle diameter 0.1 μm). The K value of the polymer in cyclohexanone was 66. 50 g of finely pulverulent calcium hydroxide (particle diameter 0.01 μm) were then added to the warm suspension and stirred in at 80° C. for 1 hour; 14.5 g of pulverulent sodium hydroxide (particle diameter 50 μm) were then added and stirred in over a further hour.

The suspension obtained was filtered, and the filter cake was dried overnight at 50° C. under a water jet vacuum. The product was readily soluble in cold water. The K value in water was 70.

EXAMPLE 9

In a 6-1 glass apparatus equipped with a stirrer, a reflux condenser and add means, 750 g of technical grade xylene, 3 g of polyvinyl ethyl ether having a K value of 50 (measured in cyclohexanone) and 375 g of maleic anhydride were heated to 80° C in a slow stream of nitrogen. At 80° C. a solution of 300 g of technical grade xylene were metered in over 2 hours, 825 g of anhydrous acrylic acid over 3 hours and a solution of 12 g of tertbutyl per-2-ethylhexanoate in 300 g of technical grade xylene over 4 hours The reaction mixture was then brought to the boil at about 136° C., a solution of 12 g of di-tert-butyl peroxide in 150 g of technical grade xylene was then metered in over 1 hour, and the mixture was subsequently refluxed for a further hour.

A sample of the suspension obtained (particles 1-5 μm in diameter, forming agglomerates 50 μm in diameter) was dried. The K value of the polymer (measured in N,N-dimethylformamide) was 30.

480 g of finely pulverulent sodium hydroxide (particle diameter 50 μm) were added to the suspension at 80° C. in the course of 1 hour and stirred in at that temperature for 1 hour, during which 1 l of technical grade xylene was added a little at a time for dilution.

The suspension obtained was introduced into a paddle dryer and dried at 80° C. under a water jet vacuum to leave a white powder. The product was readily soluble in water. The 25% strength aqueous solution had a viscosity of 46 mPa.s.

We claim:

1. A process for preparing a metal salt of a carboxyl-containing polymer, comprising the steps of:
   reacting a carboxyl- and/or carboxylic anhydride group-containing polymer suspended in an inert solvent in which the polymer and its metal salt are insoluble with a pulverulent basic metal compound;
   drying the resulting suspension of polymeric metal salt;
   adding water to the suspension of the polymeric metal salt; and
   removing the solvent by distillation.

2. The process of claim 1, wherein the carboxyl- and/or carboxylic anhydride group-containing polymer is prepared by precipitation or suspension polymerization in the same inert solvent in which the reaction of the polymer with the metal salt takes place.

3. The process of claim 1, wherein said carboxyl- and/or carboxylic anhydride group-containing polymer is prepared by polymerizing an acid or anhydride monomer selected from the group consisting of acrylic acid, methacrylic acid, crotonic acid, maleic acid, itaconic acid, citraconic acid, fumaric acid, maleic anhydride, itaconic anhydride and citraconic anhydride.

4. The process as claimed in claim 1, wherein said carboxyl- and/or carboxylic anhydride group containing polymer is prepared by copolymerizing an acid or anhydride monomer with a comonomer selected from the group consisting of olefins of from 2 to 30 carbon atoms, vinyl esters of $C_{2-10}$ monocarboxylic acids, vinyl esters of branched carboxylic acids, $C_{1-18}$ alkyl vinyl ethers, aromatic vinyl compounds, N-vinylamides, sulfo containing monomers and vinylphosphonic acid.

5. The process of claim 1, wherein the polymer product suspended in said inert solvent has a particle size ranging from $10^{-5}$ to $10^{-1}$ mm.

6. The process of claim 1, wherein said inert solvent is a straight-chain or branched aliphatic or cycloaliphatic hydrocarbon, an aromatic hydrocarbon compound, a halogenated hydrocarbon or an ester containing no less than 5 carbon atoms in the molecule.

7. The process of claim 1, wherein said suspension has a solids content ranging from 5 to 70% by weight.

8. The process of claim 1, wherein said basic metal compound is an oxide, hydrogencarbonate, carbonate or hydroxide.

9. The process of claim 1, wherein up to two equivalents of metal compound are added to the suspension per acid group in the polymer.

* * * * *